April 18, 1961 O. J. LEONE 2,979,950

DEW POINT INDICATOR

Filed June 15, 1959

INVENTOR
Otto J. Leone

By Hopgood, Leonard & Buell
his attorneys

United States Patent Office 2,979,950
Patented Apr. 18, 1961

2,979,950

DEW POINT INDICATOR

Otto J. Leone, P.O. Box 24, West Newton, Pa.

Filed June 15, 1959, Ser. No. 820,320
7 Claims. (Cl. 73—336.5)

This invention relates to a dew point indicator. More particularly, this invention pertains to an automatic device for measuring dew point temperature in a continuous manner utilizing thermoelectric cooling effects.

The measurement of dew points by means of a dew spot deposit on a polished surface by automatic means has involved the expense, bulk and trouble which accompanies the use of conventional refrigeration apparatus including components such as compressor, evaporator and condenser elements. On the other hand, a practice of this invention provides an instrument capable of automatically and continuously indicating varying dew point temperatures and, further, one which is relatively light, compact and trouble-free. Moreover, an instrument of this invention may be placed in a single case so as to be portable and usable at any location.

Figure 1:
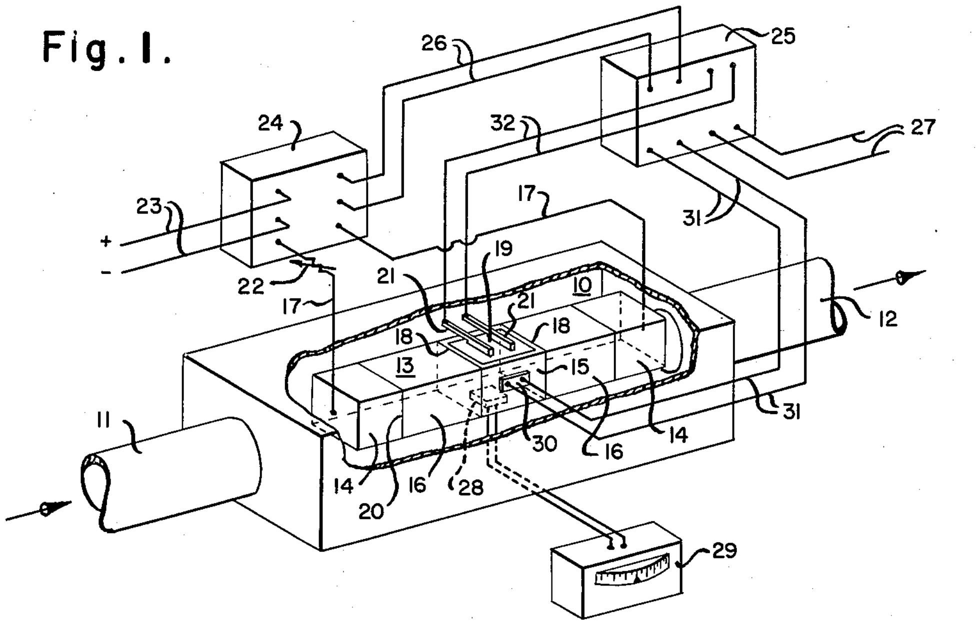
Figure 2:
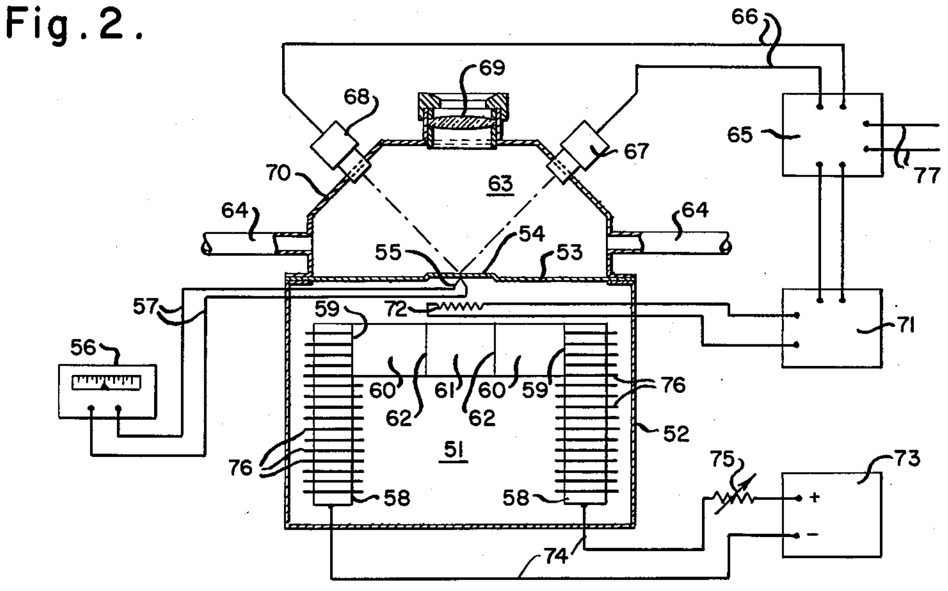

Other objects, features and advantages of this invention will be apparent from the following description and the accompanying drawings, which are illustrative only, in which:

Figure 1 is a view in perspective, partly broken away, of one embodiment of a device of this invention; and Figure 2 is a view in elevation and cross section showing another embodiment of this invention.

In the embodiment of Figure 1, there is an enclosed chamber 10 to which a stream of gas containing vapor, or a liquid entrained therein, on which dew point determination is to be made passes into the enclosure from a pipe 11 connected thereto, such gas exiting from the other side of chamber 10 through a pipe 12. These pipes have stop valve connections therein (not shown) and, further, may be made disconnectible from chamber 10 if that embodiment is to be utilized as a portable dew point indicator.

Fixed within chamber 10, there is a thermoelectric junction pack 13 comprising blocks of at least two dissimilar semiconductive substances (e.g., bismuth telluride, selenium telluride, lead telluride), or suitable semiconductor crystals which have been doped by the diffusion thereinto of impurities of respectively different polarities (e.g., silicon with phosphorus impurity forming a P-type semiconductor; and silicon with aluminum impurity forming an N-type semiconductor), or various other semiconductive substances the characteristic of which is that they have a high thermoelectric output when thermoelectric junctions are made between dissimilar ones of such substances, which will be "hot" or "cold" depending upon the direction of flow of electrons when connected in a direct current circuit.

In thermoelectric pack 13, end blocks 14 and a center block 15 of copper, which is highly conductive both electrically and thermally, may be used as a spacer and temperature equalizer at the junction or junctions between such dissimilar semiconductive substances, or such copper spacer blocks may be omitted entirely, if desired. Thus, the spaced blocks 16 of such dissimilar semiconductive substances are shown in area contact with such copper blocks. When direct current is applied to the respective ends of pack 13 through wires 17 in one direction, the junction 18—18 inclusive of the block 15 will be a "cold" or condensing junction capable of depositing and holding dew upon a dew plate 19 which in this instance is a thin leaf of electrical insulation such as glass or plastic, the temperature of which substantially follows and corresponds to the temperature of block 15. On the other hand, if the current polarity is reversed in the wires 17, the junction 18 will become a heated ("hot") junction while the remaining junctions 20 and blocks 14 will become so-called "cold" junctions, such phenomena appearing to be a manifestation of the Peltier effect. Enough direct current is normally passed through the pack 13 at all times to chill the junction 18—18 and block 15 to a point where it will measure all dew point temperatures above the selected minimum within the range of the capacity of the instrument. As shown, a variable rheostat 22 is connected in the circuit of wires 17 to regulate the approximate level of current for pack 13.

In the schematic circuit diagram shown in Figure 1, a D.C. power source in the form of a battery, rectified A.C. output, or D.C. generator, is connected across the wires 23 which lead to the terminals of a polarity reversing relay 24 to the output side of which the wires 17 are connected. The actuation of the relay in instrument 24 is controlled by an amplifier controller 25 to which it is connected by wires 26. The controller 25 receives an A.C. power supply through wires 27 and amplifies signals received from the probes 21 to increase or decrease the temperature of junction 18 and block 15 to maintain the reference dew spot, of water or salt solution, on plate 19 at the preselected standard value on which the operation is predicated. The rises and falls in temperature of block 15 caused by controller 25 maintaining such standard are picked up by a transducer 28 affixed to block 15 and transmitted to a dew point temperature meter 29 preferably calibrated for direct reading; or the meter 29 can be a recorder instead, or both a visual indicating meter and recorder.

In operation, the conductivity of the dew spot on plate 19 will vary and correspondingly affect the signal provided, continuously and automatically, by a pair of probes 21 in spaced relation to each other to detect any change in that conductivity. The probes 21 may themselves operate to provide signals on either a conductive basis, or on a capacitance basis, responsive to the conductivity of the dew spot and variations therein. The dew spot in turn may be an aqueous film, or it may be a hygroscopic "dew spot" utilizing a substance such as lithium chloride which forms a solution with water which is more conductive as it becomes more dilute due to absorption and vice versa. In the event that such a chemical dew spot is utilized in a practice of this invention, the plate 19 may incorporate a layer of absorbent material to hold the lithium chloride solution in contact with probes 21. Hence, as and if the dew spot changes in conductivity from the preset standard or reference value, beyond preset limits of tolerance, a responsive signal will be transmitted by the probes 21 to the amplifier controller 25 for the initiation of corrective action to return the dew spot to its standard reference value.

Responsively controlling the temperature of block 15 may be done in a variety of ways. As shown, a resistance heater 30 is attached to block 15 and connected to controller 25 by wires 31 to counteract any tendency to excessive chilling of block 15, by the current flowing through the wires 17, in response to signals being continuously sent out by the probes 21 through wires 32. Further, in the event that other or additional heating capacity is desired, the controller 25 may reverse the polarity of the respective wires 17 by sending a supplemental signal to that effect to relay 24 through the wires 26 until the controller probes 21 signal the restoration of the standard on dew plate 19, in which event the polarity of the relay 24 is restored to normal. It thus will be seen that the embodiment of Figure 1 is an automatic apparatus for continuously measuring the dew point temperature of a stream of gas having condensible moisture therein and that such embodiment is very compact and trouble-free as well as being relatively inexpensive to operate, and, the indication of dew point temperature provided by that embodiment is relatively free of lag. Should it be desired to have such an embodiment as a portable unit, the respective instruments and circuitry may readily be placed in a case along with the chamber and pack and transported to another location where it is to be used. Further, an embodiment such as that shown in Figure 1 may be used in the case of chemical solution dew point detectors to chill both the gas sample or stream being measured and the chemical solution, as desired, so that dew point temperatures may be measured below the temperature of the atmosphere which, for example, may surround the enclosure 10.

In the embodiment illustrated in Figure 2, a similar pack 51 is shown mounted in an insulated case 52 having a cover 53 with, in this embodiment, a polished or mirrored thermally conductive dew spot plate 54 therein. A thermocouple, or other transducer, 55 is connected to the plate to actuate a dew point temperature visual indicating meter 56 through wires 57. The pack 51 as shown comprises radiator blocks 58 of a highly electrically and thermally conductive metal like copper in surface contact with "hot" junctions 59 of the thermoelectrically different semiconductive substances 60 of the type described above. The center block 61 joins the cold junction surfaces 62 made by blocks 60, the chill of which passes through to the underside of plate 54 for the control of the aqueous dew spot standard on the upper side of that plate. The upper side of plate 54 is contained in an enclosed chamber 63 for the passage therethrough, as in the case of chamber 10, of a stream of gas containing water or other vapor for the purpose of having its dew point ascertained automatically and continuously in accord with the condensation film on plate 53. Such gas will enter by one of the pipes 64 and exit by way of the other. Direct current may be supplied by batteries in a case 73 or other suitable source to supply current to the wires 74, which have a variable rheostat 75 therein serving a purpose like that of rheostat 22. In addition, blocks 58 preferably are provided with radiating fins 76 to dissipate heat therein. An A.C. power supply to the amplifier controller 65 is provided through wires 77.

In the embodiment of Figure 2, the maintenance of the moisture dew spot at the selected standard value is performed by photoelectric means connected to an amplifier controller 65 which receives signals through a circuit having wires 66 connected to a light source 67 and a photoelectric cell 68. A visual observation window 69 is provided in the hood 70 forming the upper enclosing wall of chamber 63. Rays from light source 67 strike the plate 54 and are affected as to their reflective character by the condition of the dew spot on that plate. Hence, if the junction 62—62 is too cold and the dew spot tends to grow in size exceeding the preselected standard reference value, the signals sent to the controller 65 by the photoelectric circuit will actuate a counteracting heater control 71 to regulate a heater 72 in accordance with the output from controller 65. Conversely, the heating done by heater 72 is reduced correspondingly as the dew spot on plate 54 moves to regain its standard condition, and the amount of heat radiated by heater element 72 may be still further reduced if that dew spot tends to shrink still more to allow more cold from block 61 to reach plate 54 and bring the moisture spot back to its calibrated reference value as constantly observed by the photoelectric cell. Such fluctuations in the temperature of plate 54 are a direct measure of the fluctuations in the dew point temperature of the gas passing through chamber 63, as indicated or recorded by an instrument 56.

Although the foregoing embodiments are automatic and continuous dew point indicators, the thermoelectric packs shown therein may be utilized for the measurement of the dew point condition of air or other gas in relatively static condition, in which event the temperature at which the cold junction first produces a dew upon the central block would be the dew point temperature and be readily measurable by a thermocouple connected to that block or a dew point plate bonded thereto.

Various changes may be made in the illustrated embodiments and features thereof, and other embodiments provided, without departing from the spirit of this invention or the scope of the appended claims.

I claim:

1. A dew point indicator comprising, in combination, a thermoelectric pack of dissimilar thermoelectric materials having a cold junction, means for controlling the direct current flowing through said pack to control the temperature of said cold junction to maintain a standard value in a dew spot on a dew plate as a single standard, supplemental resistance heating means for controlling the temperature of said cold junction to maintain a standard value in a dew spot on a dew plate as a single standard, means for directly detecting variations in said dew spot from said standard value to actuate corrective action by at least one of said means for controlling, a meter to show said temperature variations in said cold junction, and means to dissipate heat from the hot junction in said pack.

2. A dew point indicator comprising, in combination, a thermoelectric pack having a cold junction and a dew spot member thermally responsive to the temperature of said cold junction, means for presetting the temperature of said cold junction to provide a standard moisture spot on said member as a single standard, supplemental means for directly heating said member as a partial offset to the temperature of said cold junction, means for directly detecting variations from said standard because of a variation in the vapor content of a gas sweeping said member, means responsive to said last-mentioned means to actuate said supplemental means to restore said standard, and meter means to indicate temperature variations in said member.

3. A dew point indicator comprising, in combination, a thermoelectric pack having a cold junction and a member thermally responsive to the temperature of said cold junction, means for controlling the operative temperature effect of said cold junction upon said member, means for presetting the value of a moisture spot standard on said member, spaced potential-responsive means for detecting directly variations from said standard because of a variation in the vapor content of a gas passing said member, and means responsive to said means for detecting to become unbalanced to actuate said means for controlling to maintain said standard.

4. A dew point indicator comprising, in combination, a thermoelectric device of dissimilar thermoelectric materials having hot and cold junctions, means for controlling the base temperature of said junctions, supplemental means for varying the base temperature of said cold junction to maintain a standard value of a liquid spot on a dew plate, and means directly responsive by becoming unbalanced due to variations from said standard value to restore the same.

5. A dew point indicator comprising, in combination, a thermoelectric pack of dissimilar thermoelectric materials providing a cold junction, an enclosure having a dew plate therein, means for passing a gas stream through said enclosure, said dew plate normally having a standard dew spot and being responsive to changes in the temperature of said cold junction to maintain said standard dew spot, means to unbalance an electrical balance to indicate changes in the value of said standard dew spot caused by changes in the vapor content of said gas stream, control means responsive to signals from said last-named means to change the temperature of said dew plate to an extent sufficient to maintain the value of the dew spot at such standard, and indicating means showing changes produced in the temperature of said dew plate to indicate said dew point.

6. A dew point indicator as set forth in claim 5 in which said means to indicate comprise photoelectric means.

7. A method of continuously indicating dew point comprising, in combination, passing a stream of gas to have its dew point temperature measured through an enclosure, varying the temperature of a dew plate in that enclosure by a thermoelectric effect in correspondence to the dew point condition of said stream of gas to maintain a standard reference value in a dew spot on said plate, and directly detecting changes in said dew spot from said standard reference value by electrical unbalance from a balanced condition to initiate corrective responsive action to maintain said dew spot at such standard reference value irrespective of variations in the dew point of said stream of gas.

References Cited in the file of this patent

UNITED STATES PATENTS

| | | |
|---|---|---|
| 2,554,440 | Coburn | May 22, 1951 |
| 2,624,195 | Van Alen | Jan. 6, 1953 |
| 2,649,707 | Donath et al. | Aug. 25, 1953 |
| 2,671,334 | Gunn | Mar. 9, 1954 |
| 2,685,608 | Justi | Aug. 3, 1954 |